United States Patent
Choi et al.

(10) Patent No.: US 8,611,486 B2
(45) Date of Patent: Dec. 17, 2013

(54) ADJUSTMENT OF CLOCK SIGNALS REGENERATED FROM A DATA STREAM

(75) Inventors: Hoon Choi, Mountain View, CA (US);
Daekyeung Kim, Palo Alto, CA (US);
Ju Hwan Yi, Sunnyvale, CA (US);
Young Don Bae, Mountain View, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 304 days.

(21) Appl. No.: 13/083,399

(22) Filed: Apr. 8, 2011

(65) Prior Publication Data

US 2012/0257699 A1  Oct. 11, 2012

(51) Int. Cl.
*H04L 7/00* (2006.01)

(52) U.S. Cl.
USPC ........... 375/371; 375/294; 375/327; 375/354; 375/365; 375/376

(58) Field of Classification Search
USPC ......... 375/215, 294, 295, 316, 327, 354, 365, 375/371, 376
See application file for complete search history.

(56) References Cited

U.S. PATENT DOCUMENTS

| | | | | |
|---|---|---|---|---|
| 5,852,630 A | * | 12/1998 | Langberg et al. | 375/219 |
| 6,265,916 B1 | * | 7/2001 | Ono et al. | 327/116 |
| 8,139,702 B1 | * | 3/2012 | Fortin et al. | 375/373 |
| 2007/0189399 A1 | | 8/2007 | Christison et al. | |
| 2008/0198153 A1 | | 8/2008 | Yu et al. | |
| 2009/0109988 A1 | | 4/2009 | Musunuri et al. | |
| 2009/0175397 A1 | * | 7/2009 | Lee et al. | 375/376 |
| 2009/0232262 A1 | * | 9/2009 | Ku et al. | 375/355 |
| 2010/0020912 A1 | * | 1/2010 | Lesso | 375/376 |
| 2011/0075782 A1 | * | 3/2011 | Zhang et al. | 375/376 |
| 2011/0193970 A1 | * | 8/2011 | Zhu | 348/180 |
| 2011/0267116 A1 | * | 11/2011 | Yang et al. | 327/156 |
| 2012/0236755 A1 | * | 9/2012 | Chorney et al. | 370/253 |

OTHER PUBLICATIONS

"DisplayPort(R) Technical Overview," Vesa, May 2010, 83 pages.
"High-bandwidth Digital Content Protection System Revision 1.3," Digital Content Protection LLC, Dec. 21, 2006, 90 pages.
"High-bandwidth Digital Content Protection System v1.3 Amendment for DisplayPort Revision 1.1," Digital Content Protection LLC, Jan. 15, 2010, 209 pages.

(Continued)

*Primary Examiner* — Hirdepal Singh
(74) *Attorney, Agent, or Firm* — Blakely Sokoloff Taylor Zafman LLP (57) ABSTRACT

Embodiments of the invention are generally directed to adjustment of clock signals regenerated from a data stream. An embodiment of a method includes receiving a data stream from a transmitting device via a communication link, the data stream including stream data, a link clock signal, and timestamps to indicate a relationship between the link clock signal and a stream clock signal. The method further includes adjusting the stream clock based at least in part on one or more measurements related to the data stream, the one or more measurements including a count of a number of pulses of the stream clock during a period of time, or a measurement of a number of data elements from the data stream stored in a buffer at a certain point in time.

10 Claims, 7 Drawing Sheets

(56) References Cited

OTHER PUBLICATIONS

"High-Definition Multimedia Interface Specification Version 1.3," HDMI Licensing, LLC, Jun. 22, 2006, 237 pages.

"VESA DisplayPort Standard Version 1, Revision 1a," Jan. 11, 2008, 238 pages.

International Search Report and Written Opinion of the International Searching Authority, in International Patent Application No. PCT/US2012/030838, 8 pages.

Kobayashi, A., "DisplayPort Ver. 1.2 Overview," Vesa, DisplayPort Developer Conference, Dec. 6, 2010, Taipei, 34 pages.

* cited by examiner

ADJUSTMENT OF CLOCK SIGNALS REGENERATED FROM A DATA STREAM

TECHNICAL FIELD

Embodiments of the invention generally relate to the field of electronic data communications and, more particularly, to adjustment of clock signals regenerated from a data stream.

BACKGROUND

In the transmission of data streams between electronic devices, it is common for a data stream to contain clock signal information. In such operations, commonly a transmitting (source) device or other device sending a data stream (such as, for example, a stream of multimedia data) will insert the clock signal information into the data stream and a receiving (sink) device operates to recover the clock signal information from the data stream.

In an example, DisplayPort™, such as defined by DisplayPort Version 1.2 (Dec. 22, 2009) and earlier specifications, includes the transmission of clock data, the DisplayPort system includes a link symbol clock signal to transfer data though a communication link between a source device and a sink device, and a stream clock signal to transfer pixel and other data inside the source device and the sink device. The source device transmits time stamp values having a relation to the link symbol clock and stream clock frequencies to allow for regeneration of stream clock based the time stamp values and the link symbol clock signal.

However, link clock and stream clock signals may not have any relationship with each other, and may drift with respect to each other. Conventional systems and processes for the recovery of time stamp values from a data stream may require significant hardware to regenerate the stream clock, and may require significant buffer storage to store recovered stream data prior to the usage of the data.

BRIEF DESCRIPTION OF THE DRAWINGS

Embodiments of the invention are illustrated by way of example, and not by way of limitation, in the figures of the accompanying drawings in which like reference numerals refer to similar elements.

SUMMARY

Embodiments of the invention are generally directed to adjustment of clock signals regenerated from a data stream.

In a first aspect of the invention, an embodiment of a method includes receiving a data stream from a transmitting device via a communication link, the data stream including stream data, a link clock signal, and timestamps to indicate a relationship between the link clock signal and a stream clock signal. The method further includes adjusting the stream clock based at least in part on one or more measurements related to the data stream, the one or more measurements including a count of a number of pulses of the stream clock during a period of time, or a measurement of a number of data elements from the data stream stored in a buffer at a certain time.

In a second aspect of the invention, an embodiment of an apparatus includes a receiver to receive a data stream via a communication link with a transmitting device, the data stream being clocked at a link clock signal rate, the data stream including timestamps to indicate a relationship between the link clock signal and a stream clock signal. The apparatus further includes a stream clock recovery unit to regenerate the stream clock signal based at least in part on the link clock signal and the timestamps, and a data buffer to hold data elements from the data stream. The apparatus is to adjust a rate of the stream clock signal based at least in part on one or more measurements related to the data stream, the one or more measurements including one or more of a count of a number of pulses of the stream clock during a period of time, or a measurement of a number of data elements from the data stream stored in a buffer at a certain time.

DETAILED DESCRIPTION

Embodiments of the invention are generally directed to adjustment of clock signals regenerated from a data stream.

In some embodiments, a method, apparatus, or system provides for regeneration of a clock signal from a data stream based at least in part on data measurements related to the data stream. In some embodiments, a method, apparatus, or system provides for one or more measurements of a number of clock pulses in a given time period and measurements of data stored in a buffer at a certain point in time.

The DisplayPort system protocol includes two different clock sources referred to as the "link symbol clock" and the "stream clock". The link symbol clock is used to transfer data though a communication channel between the source device (on the transmitter side) and the sink device (on the receiver side). In such protocol, the link symbol clock has a fixed data rate of 1.62 Gbps (Gigabits per second), 2.7 Gbps or 5.4 Gbps. The stream clock is used to transfer each pixel data inside the source device and the sink device. In DisplayPort, the stream clock frequency is not relevant to or related to the link symbol clock frequency, and varies depending on the relevant display settings such as resolution, blanking period, and frame rate.

In conventional operation, a sink device operates to reconstruct the video data and the stream clock. In order to allow for reconstruction of the stream clock at the receiver side, the source device sends time stamp values "M" and "N", which have the following relation to the ratio of the link symbol clock frequency and the stream clock frequency:

$$\frac{M}{N} = \frac{f_{Stream\ clock}}{f_{Link\ Symbol\ clock}}$$

In conventional operations, a receiving device utilizes the values of the timestamps to determine the relationship of the stream clock with the link symbol clock, and, based on the link symbol clock and the recovered timestamps, regenerates the link stream clock. In conventional operations, a receiving device will adjust the stream clock as values of the timestamps are varied in order to maintain accuracy of the stream clock signal.

Figure 1:
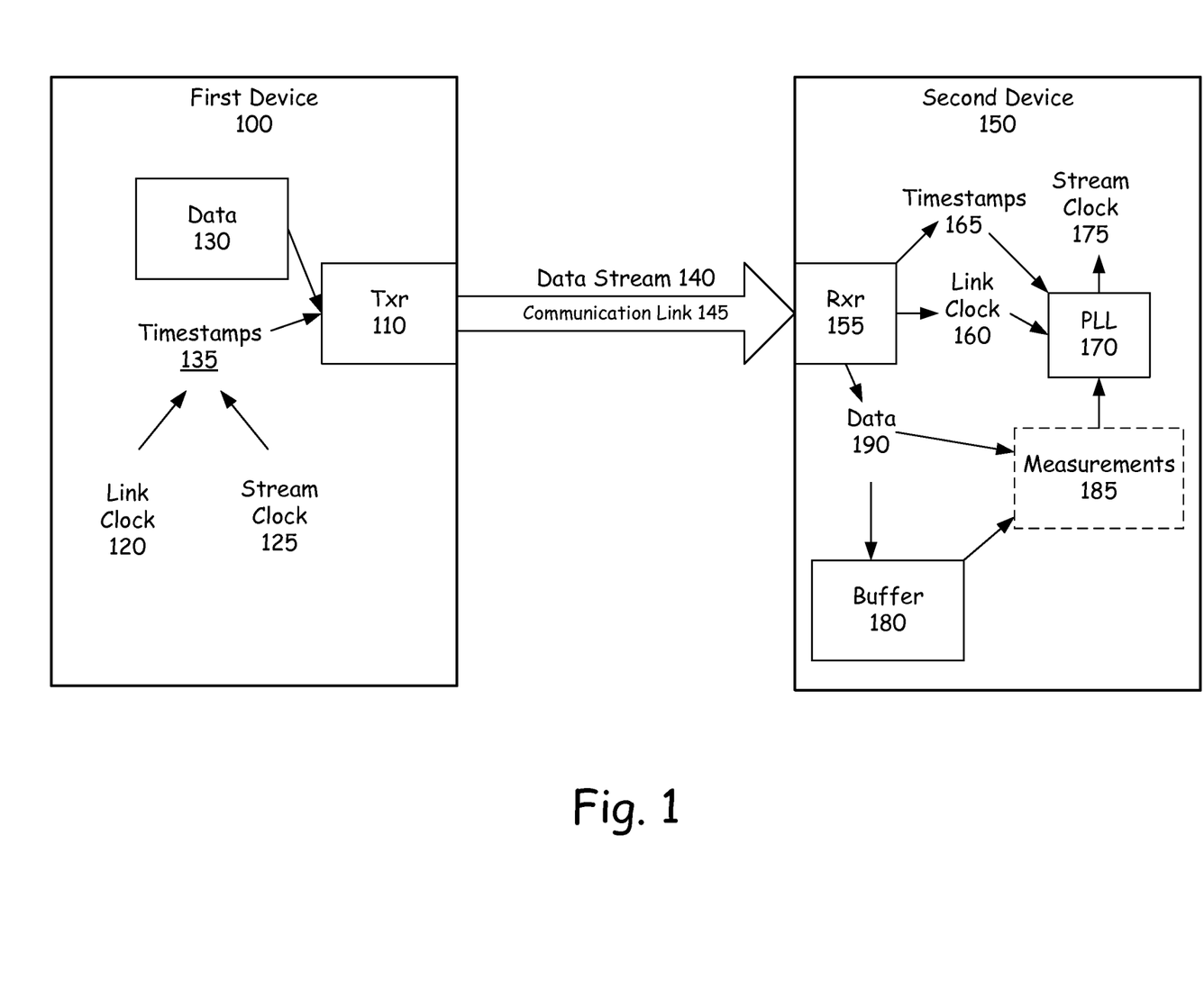
FIG. 1 is an illustration of an embodiment of a system for generating a stream clock from a data stream.

FIG. 1 is an illustration of an embodiment of a system for generating a stream clock from a data stream. In this high level figure, a first device 100 includes a transmitter 110, the transmitter to transmit a data stream 140 via a communication link 145 according to a link clock rate 120, the data stream including content and other data 130 and timestamps 135 to indicate a relationship between the link clock signal 120 and a stream clock signal 125 for the transferred data.

In some embodiments, a second device 150 having a receiver 155 receives the data stream 140 via the communication link 145, the second device 150 operating to recover the link clock signal 160 and the timestamps 165 to regenerate the stream clock signal, the second device including a phase locked loop (PLL) 170 for use in generating the stream clock 175 and a buffer 180 to hold data 190 received from the data stream. In some embodiments, the second device further provides for one or more measurements related to the data stream 185, the second device 150 operating to adjust the stream clock signal rate by modifying the rate of the phase locked loop 170 based at least in part on the one or more measurements 185. In some embodiments, the one or more measurements 185 include one or more of a measurement of the number of pulses of the stream clock during a certain time period; and a measurement of a number of data elements stored in the buffer 180 at a certain time.

Figure 2:
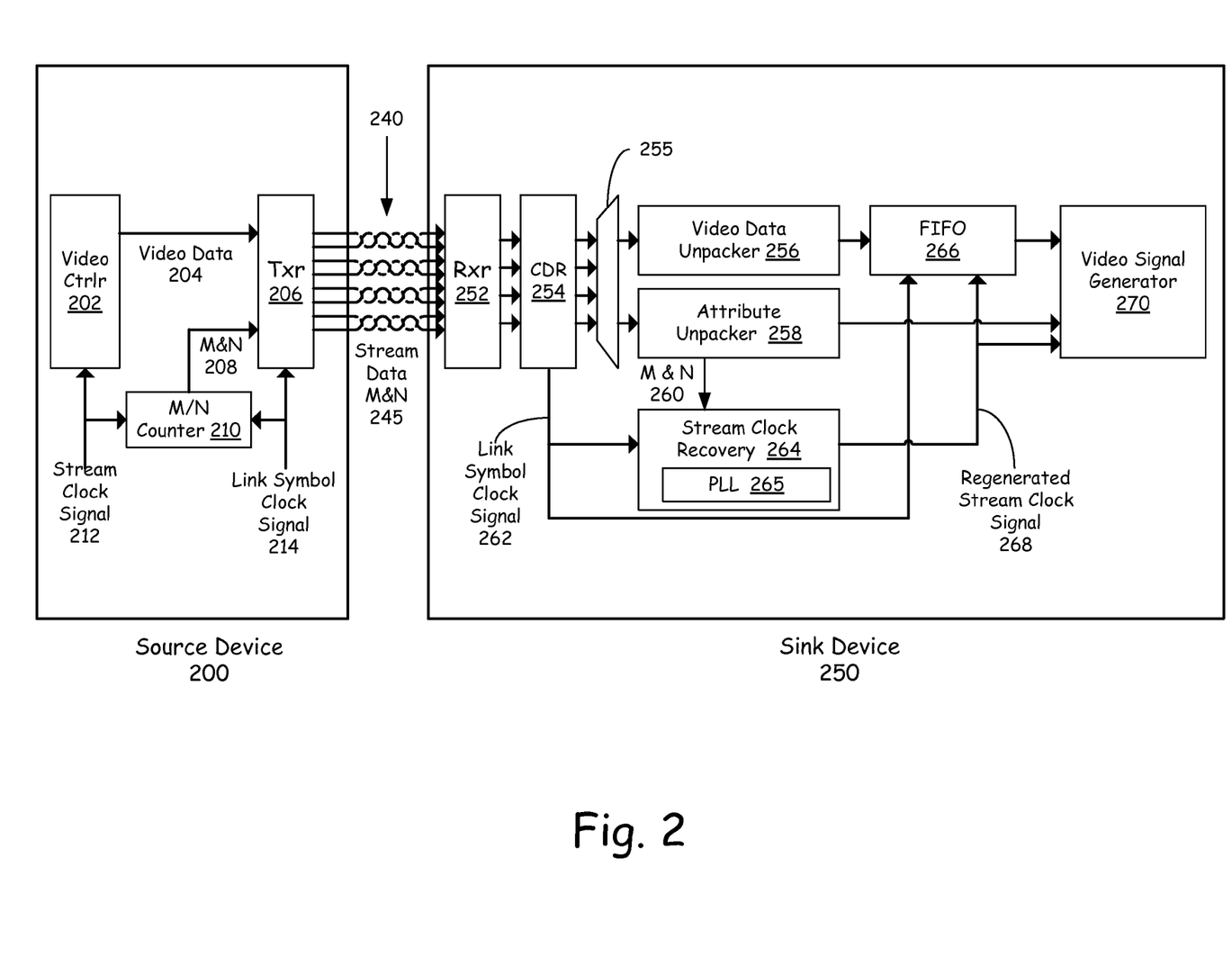
FIG. 2 is a block diagram to illustrate an embodiment of a system for regenerating a stream clock from a data stream.

FIG. 2 is a block diagram to illustrate an embodiment of a system for regenerating a stream clock from a data stream. In this illustration, a source device 200 is coupled with a sink device 250 via an interface 240. As illustrated, the source device 200 may include a video controller 202 providing video data 204 to a transmitter (Txr) 206 for transmission via the interface 240 to the sink device 250. As shown, the video controller 202 operates according to a stream clock signal 212 and the transmitter 206 receives a link clock signal 214 for clocking of the data transmission via the interface 240. The stream clock signal 212 and the link clock signal 214 are further provided to an M/N counter 210, which utilizes such signals to generate M and N values 208 for transmission by the transmitter 206. The transmitted data stream thus includes the stream data and the M and N values 245.

As further illustrated in FIG. 2, the sink device 250 further includes a receiver 252 to receive the data stream from the interface 250. The receiver 252 provides the received data to a clock and data recovery unit 254, which operates to recover data, directed to decoder 255, and to recover the link symbol clock signal 262, which is provided to a stream clock recovery unit 264 and to a buffer, shown as FIFO (first in, first out) buffer 266. Data recovered from the stream data is directed by the decoder 255 to a video data unpacker 256, which provides the video data to the FIFO buffer 266, and to an attribute unpacker 258, which obtains the M and N values 260 and provides such data to the stream data recovery unit 264. The sink device 250 may include a phase locked loop 265, which is illustrated as a part of the stream data recovery unit 264 but which may also be a separate element. Utilizing the link symbol clock signal and the M and N values the stream clock recovery unit 264 regenerates the stream clock signal, and provides the regenerated stream clock signal 268 to the FIFO buffer 266 and a video signal generator 270, which receives the video data from the FIFO buffer 266 based on the regenerated stream clock signal.

In operation, the setting of the values of M and N varies based on the relationship of the clocks. If the two clock signals have the same clock source and are divided by a given number, then the source device is aware of the ratio of the two clock frequencies, and thus can set constant values for M and N. However, if the two clock signals have clock sources that are unrelated to each other, then the source device is required to calculate the M and N values over time, such as by counting the number of stream clock pulses during the time for a given number of link symbol clock pulses. As unrelated clock signals generally will drift in relation to each other, the values of M and N consequently change over time and must be recalculated over time. In a particular example, for DisplayPort in asynchronous mode, the N value is fixed as 32768.

As described above, a sink device recovers the stream clock by extracting the time stamp values M and N from the received stream data and regenerating the stream clock. However, conventional operations to regenerate the stream clock in a sink device face certain difficulties. One difficulty is the complexity and size of the required PLL. In a DisplayPort transmission, the timestamp values M and N are 24-bit values, and a 24-bit fractional phase locked loop is generally required to generate an accurate stream clock signal. However, a 24-bit fractional PLL requires complex circuitry, and consequently requires a large amount of silicon area in a device or system. In a conventional apparatus or system there may be an attempt to utilize an area-efficient PLL design to reduce the required area needed, such as, for example, a delta-sigma fractional PLL. Further, by operating with alternate determination of M and N values, a higher resolution PLL that only addresses one of the M or N values at a time may be implemented in a sink device.

However, there are other difficulties in achieving an accurate stream clock signal. First, the clock sources in the source device are imperfect due to frequency displacement. Second, the M and N values themselves are not accurate because, for example, the values are updated once per 32,768 link symbol clock cycles, which requires hundreds of microseconds. If the phase differences are accumulated for such a time period, the phase differences may result in additional or missing clock pulses that can generate significant display artifacts and violations on the compliance with display devices. In order to compensate for inaccuracy, a very large FIFO buffer is required to prevent buffer underrun or overflow.

In some embodiments, the sink device 250 may provide stream clock recovery utilizing less complex hardware, such as a low-resolution PLL and a small-size FIFO. In some embodiments, the sink device operates to provide accurate regeneration of the stream clock utilizing measurements of the data stream.

In some embodiments, an apparatus or system may utilize a count of clock pulses between blank start or blank end symbols decoded by the attribute unpacker 258 in the determination of a stream clock signal. In some embodiments, an apparatus or system may utilize a level of the FIFO buffer 266 in adjusting the stream clock frequency.

Figure 3:
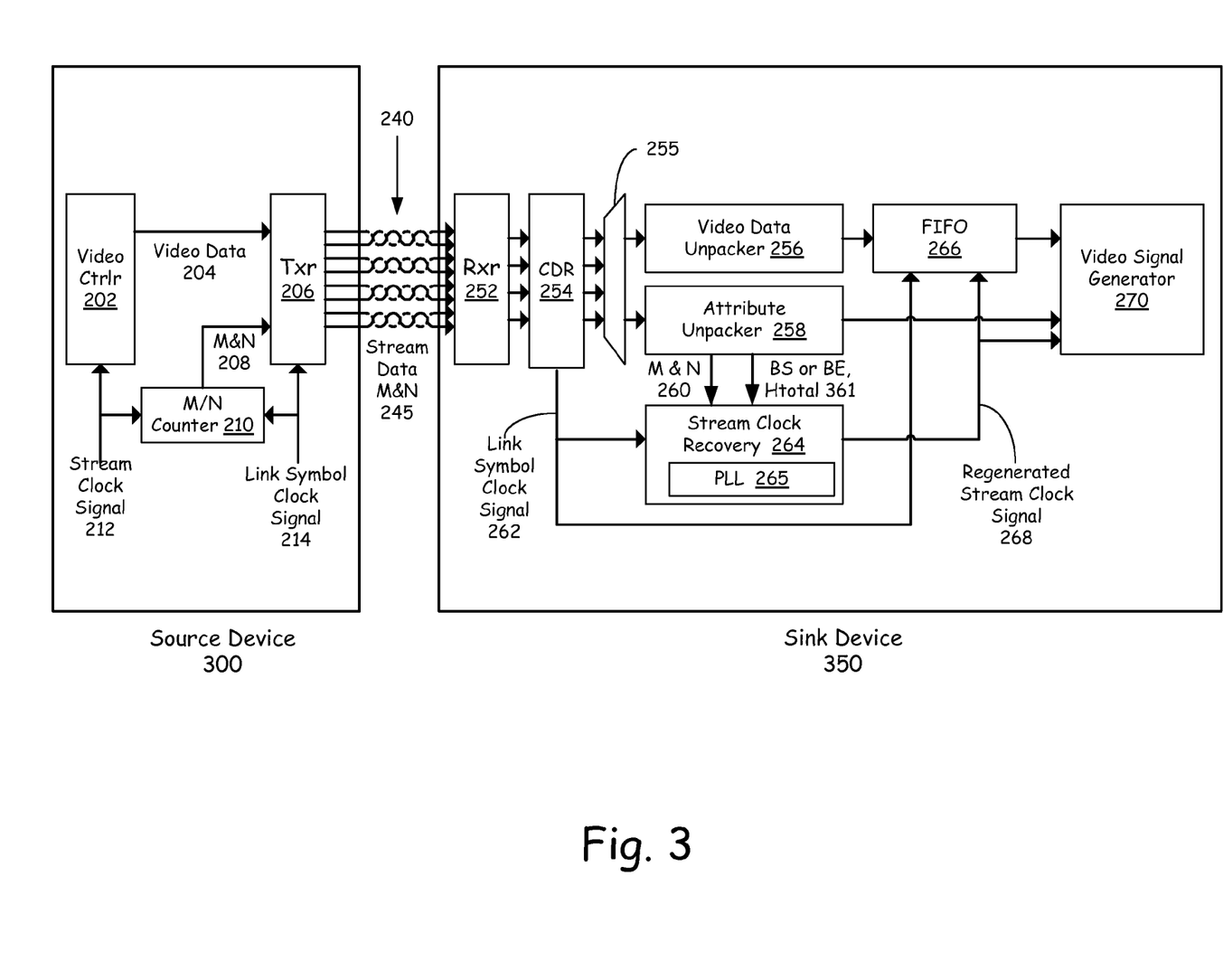
FIG. 3 is a block diagram to illustrate an embodiment of a system for regenerating a stream clock from a data stream including measurement of clock data pulses.

FIG. 3 is a block diagram to illustrate an embodiment of a system for regenerating a stream clock from a data stream including measurement of clock data pulses. In some embodiments, a source device 300 transmits a data stream to a sink device 350. In addition to elements described with regard to FIG. 2, in some embodiments, an apparatus, system, or method provides for counting the number of stream clock pulses between consecutive blank start symbols or blank end symbols (BS or BE). In some embodiments, the video controller 202 of the source device 300 determines a number of stream clock pulses for one horizontal line period according to the display resolution and provides such number of pulses to the transmitter 206 to transfer it to the sink device 350, together with the value of Htotal, where Htotal is a reference value representing the expected number of pulses in a period of a horizontal line. In some embodiments, the operation by the illustrated attribute unpacker further includes detected blank start or blank end symbols and the Htotal value.

In some embodiments, at the receiver side, the stream clock recovery unit 264 utilizes the M and N signals 260 together with the blank start or block end values and the Htotal value 361 in the regeneration of the stream clock signal 268. In some embodiments, if the number of stream clock pulses generated between two blank start symbols or two blank end symbols is greater than Htotal, then the sink device 350 acts to slow the PLL 265 of the stream clock recovery unit 264, thereby reducing the rate of the regenerated stream clock signal. If the number of stream clock pulses generated for a certain time period, such as one horizontal line period, is less than Htotal, then the sink device 350 acts to increase the speed of the PLL 265 of the stream clock recovery unit 264, thereby increasing the rate of the regenerated stream clock signal.

In some embodiments, an apparatus, system, or method provides an opportunity to adjust the PLL more often than a conventional method based on timestamp M and N values only. The blank start and blank end signals are received for every line, while the time stamp value is generally updated once per several lines (such as every eight lines for a 1080 p display). In some embodiments, the required size of FIFO for preventing buffer underrun and overflow is much smaller than in a conventional method.

In some embodiments, an apparatus, system, or method allows for stream clock recovery to be handled earlier than in a conventional method, with a result that the clock phase error may be reduced, and the required FIFO size may be reduced because the overflow data is smaller in comparison with the conventional generation of the stream clock signal.

Figure 4:
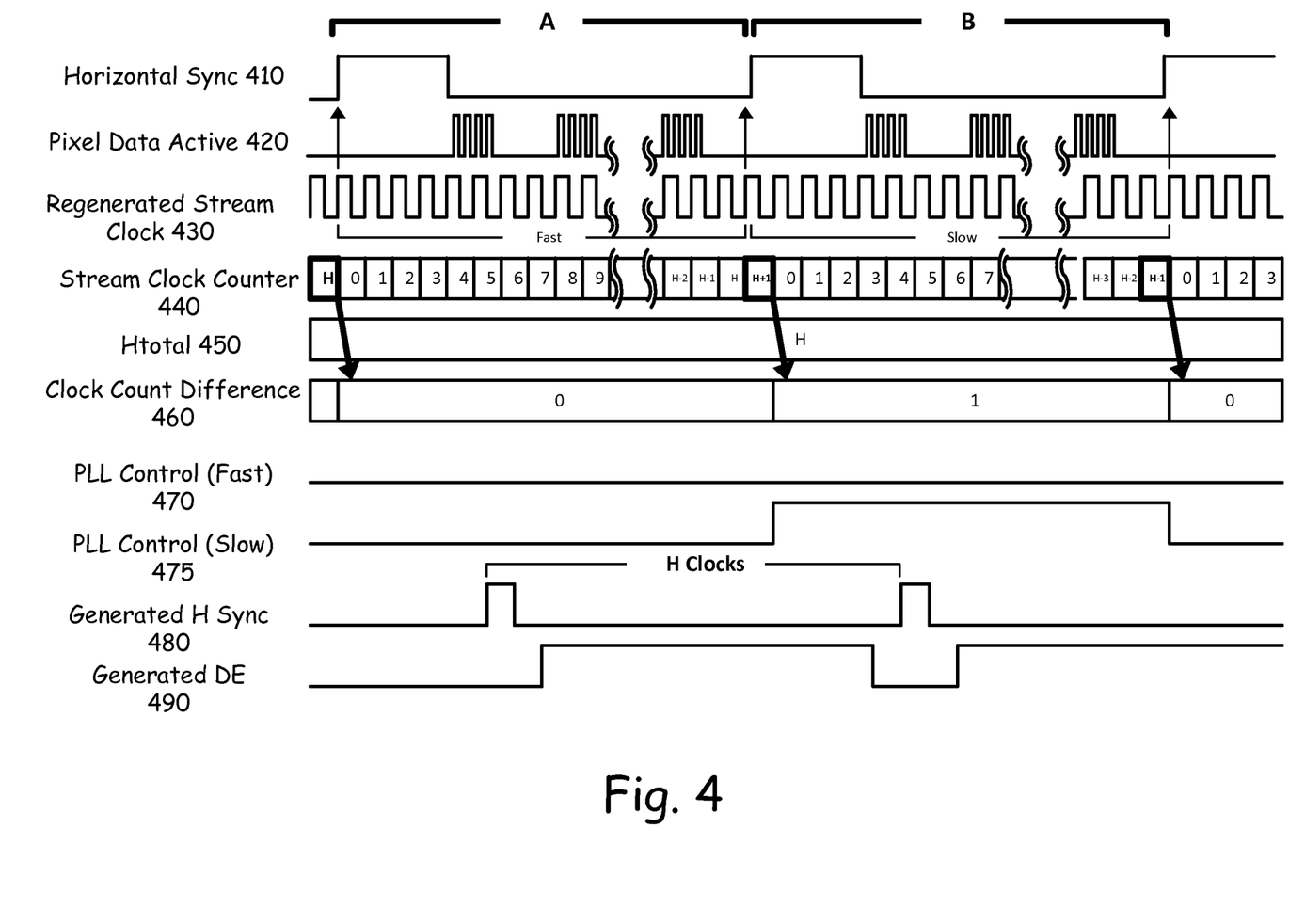
FIG. 4 is a timing diagram to illustrate an embodiment of a process for regeneration of a stream clock signal.

FIG. 4 is a timing diagram to illustrate an embodiment of a process for regeneration of a stream clock signal. In this illustration, horizontal sync signals 410 are provided for lines of data, with pixel data being transmitted after the sync signals 420. As illustrated, a stream clock 430 is regenerated from a received data stream. In some embodiments, an apparatus or system includes a stream clock counter 440 to determine the number of stream clock pulses in a period of time such as in any horizontal line, with the number being compared to an Htotal value 450, where the value is denoted as "H", the differences between and the count being shown as the clock count difference 460. In this illustration, the number of pulses is H for a first line resulting in a clock count difference of zero; H+1 for a second line resulting in a total clock count difference of one; and H−1 for a third line, resulting in a total clock count difference of zero. In some embodiments, an apparatus or system provides a PLL control signal (fast) 470 for causing the PLL to run faster, resulting in an increase in the stream clock rate, and a PLL control signal (slow) 475 for causing the PLL to run slower 475, resulting in a decrease in the stream clock rate. In this illustration, both the PLL control signal (fast) 470 and the PLL control signal (slow) 475 are disabled when the clock count difference is zero, with PLL (slow) 475 being enabled to decrease the stream clock rate when the clock count difference is a positive value. Similarly, the PLL (fast) 470 would be enabled to increase the stream clock rate if the clock count difference becomes a negative value. FIG. 4 further illustrates the generated horizontal sync signals 480 and the generated data 490.

Figure 5:
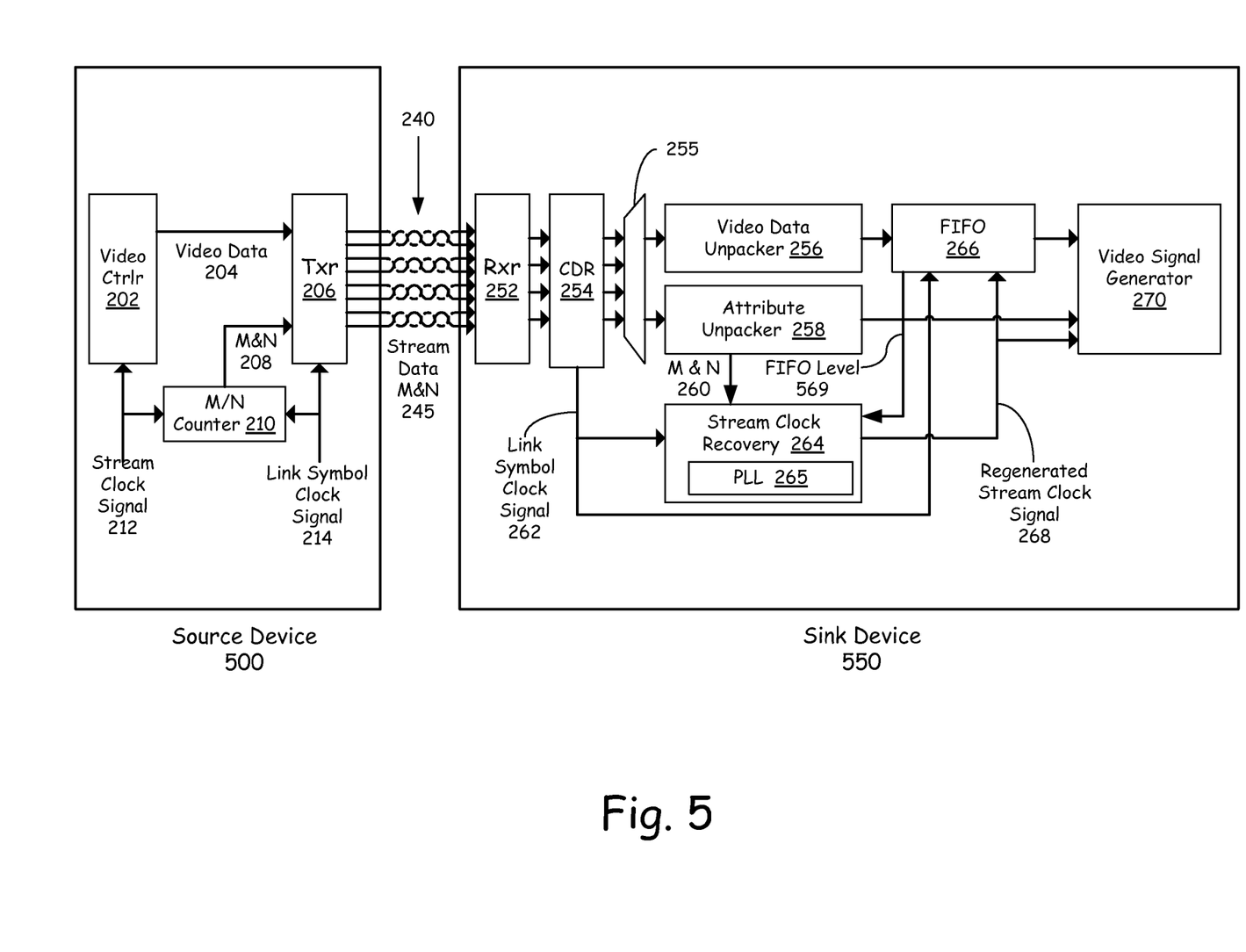
FIG. 5 is a block diagram to illustrate an embodiment of a system for regenerating a stream clock from a data stream including measurement of buffer storage.

FIG. 5 is a block diagram to illustrate an embodiment of a system for regenerating a stream clock from a data stream including measurement of buffer storage. In some embodiments, a source device 500 transmits a data stream to a sink device 550. In addition to elements described with regard to FIG. 2, in some embodiments, a method, apparatus, or system utilizes a FIFO buffer level in the adjustment of a PLL frequency for the regeneration of a stream clock signal. In some embodiments, counting the number of the pixels written into the FIFO buffer during the time for a given number of the stream clock pulses can provide an indicator of the relationship between the stream clock and the link symbol clock.

In some embodiments, the stream clock recovery unit 264 at certain times obtains a level 569 of the FIFO buffer 266. In some embodiments, the FIFO level 569 may, for example, be read before a first pixel data element is read from the FIFO buffer or during a time when the pixel data is being read out from the buffer 266. However, embodiments are not limited to measurements at any particular point in time, and may include any time before or after the reading of pixel data is commenced.

In some embodiments, at the point in time when a FIFO level is determined, the FIFO level 569 provides the number of data elements stored minus the number of data elements that have been read out, and may represent a ratio between how quickly data is being written to the FIFO buffer 266 to how quickly the data is being read out of the FIFO buffer. In operation, the data is written to the FIFO buffer 266 according to the link symbol clock, and is read out of the FIFO buffer according to the recovered stream clock. Thus, the FIFO level 569 represents a relationship between the link symbol clock frequency and the stream clock frequency. In some embodiments, if the FIFO buffer level 569 increases, indicating that data is being stored in the FIFO buffer 266 more quickly than the data is being read out of the FIFO buffer, then the frequency of the PLL 265 is increased to increase the speed of read out. Further, if the FIFO buffer level 569 decreases, indicating that data is being stored in the FIFO buffer 266 more slowly than the data is being read out of the FIFO buffer, then the frequency of the PLL 265 is decreased to decrease the speed of read out. In some embodiments, the frequency of the PLL 265 of the stream clock recovery unit 264 is controlled to be faster or slower based at least in part on a comparison of the current FIFO buffer level 569 to a level of a previous time of measurement or to a reference value, and the sink device 550 operates to adjust the PLL speed accordingly.

Figure 6:
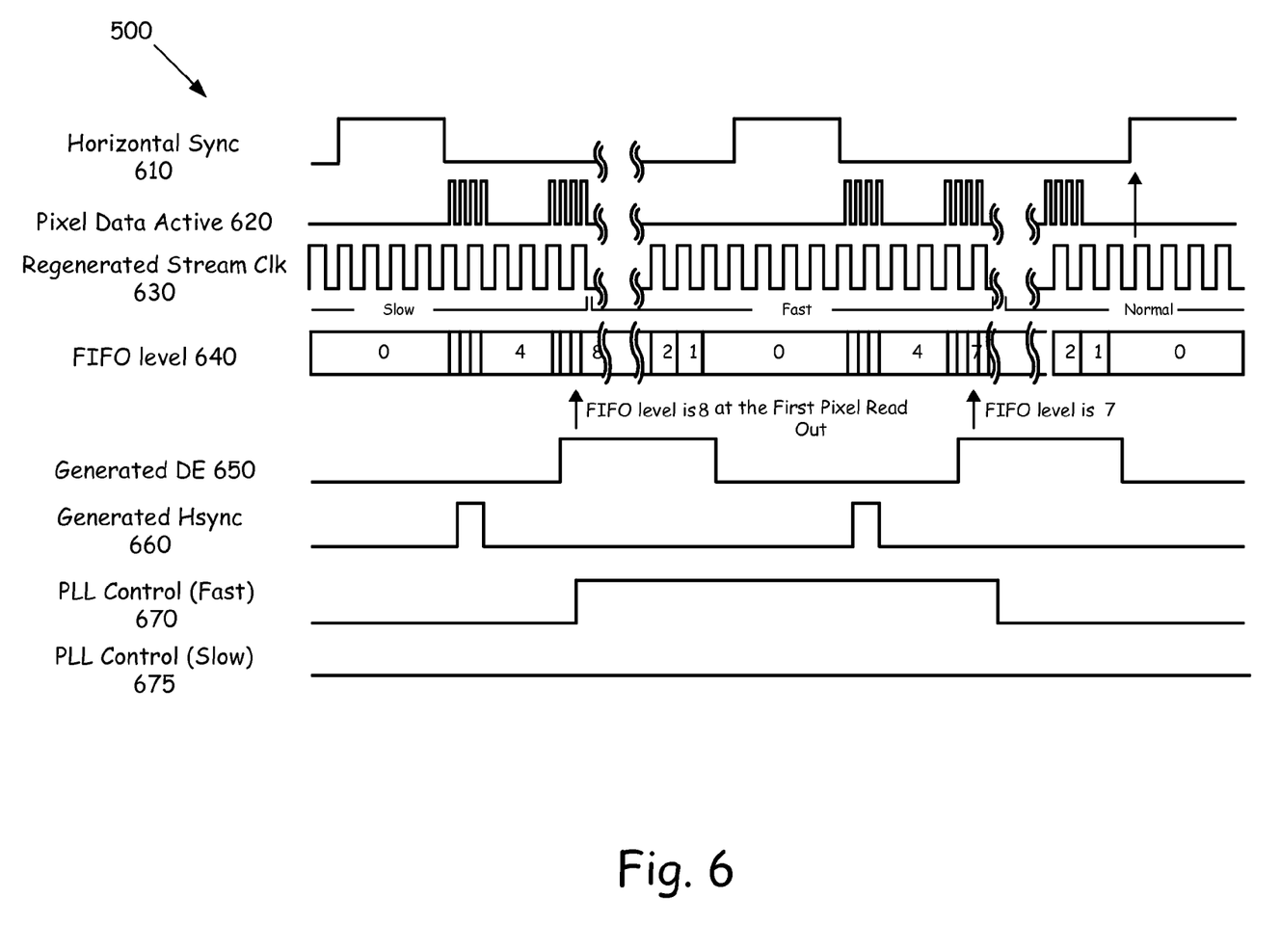
FIG. 6 is a timing diagram to illustrate an embodiment of a process for regeneration of a stream clock signal.

FIG. 6 is a timing diagram to illustrate an embodiment of a process for regeneration of a stream clock signal. In this illustration, periodic horizontal sync signals 610 denote the start of each of a series of lines, with pixel data 620 being transmitted after the sync signals. As illustrated, a stream clock 630 is regenerated from a received data stream. In some embodiments, an apparatus or system includes a FIFO buffer level 640, the FIFO buffer level representing a number of pixels or other data elements that are stored in the FIFO buffer at a certain point in time, such as a point in time before a pixel is read from the buffer for a particular line.

For example, as shown the FIFO buffer level 640 is 8 at the time of a first pixel read out for a first line (as shown by the generated DE 650), and is 7 at the time of a first pixel being read out for a second line. In this example, it may be assumed that a prior FIFO buffer level or reference value is 7 for a point in time when a first pixel is read from the FIFO buffer. In some embodiments, an apparatus or system provides for causing the PLL to run faster 670, an increase in the stream clock rate, or slower 675, a decrease in the stream clock rate, based on the FIFO level. In this illustration, both the PLL (fast) 670 and PLL (slow) 675 are disabled when the FIFO level is 7 (or another reference level), with PLL (fast) 670 being enabled to increase the stream clock rate when the FIFO level is above 7 indicating that the clock is running slow, such as illustrated in FIG. 6. Similarly, the PLL (slow) 675 would be enabled to increase the stream clock rate if the FIFO level was below the previous or reference level. FIG. 6 further illustrates the generated horizontal sync signals 660.

In some embodiments, as the stream clock and the link symbol clock varies a small degree, the FIFO levels will vary at the point of the first pixel of each horizontal line. If the FIFO level is smaller than the reference value, the stream clock is faster than the expected rate and thus the pixel data is being read before the FIFO level reaches the reference level. On the other hand, a FIFO level greater than the reference value means the stream clock is slower than the expected rate and thus the pixel data is being read after the FIFO buffer reaches the reference level. In the example provided in FIG. 6, the expected FIFO level at the moment the first pixel is read out is 7. A FIFO level of 8 rather than 7 results in the assertion of PLL control signal (Fast) 670 to increase the PLL frequency.

In some embodiments, a method, apparatus, or system uses signal analysis including multiple measurements related to the received data stream. In some embodiments, the regeneration of a clock signal includes both the determination of a number of clock pulses in a certain period and the determination of an amount of data stored in a buffer at a certain point in time.

Figure 7:
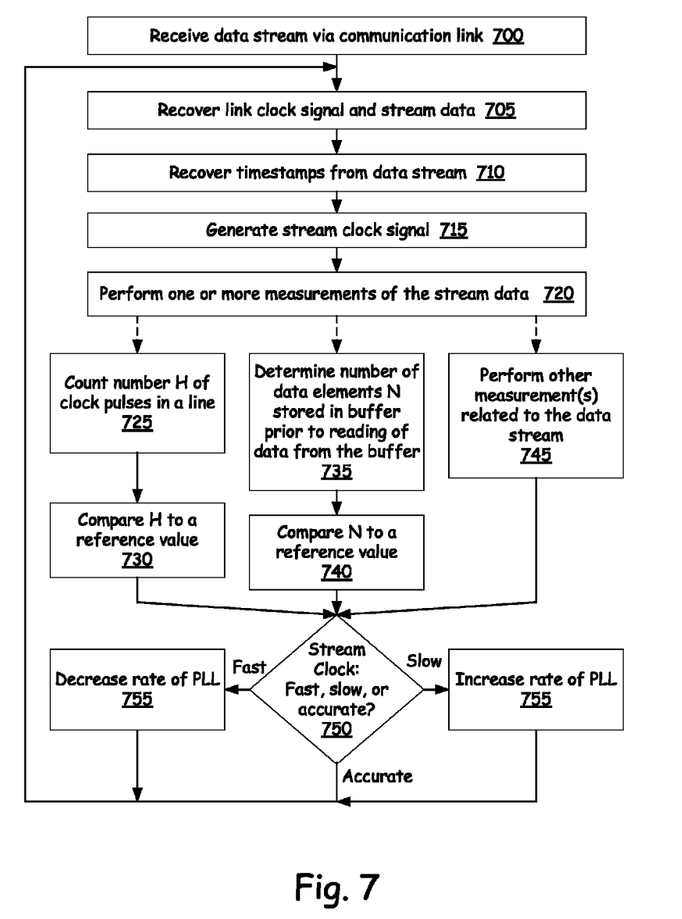
FIG. 7 is a flowchart to illustrate an embodiment of a process for regeneration of a clock signal.

FIG. 7 is a flowchart to illustrate an embodiment of a process for regeneration of a clock signal. In some embodiments, a process includes receiving a data stream at a receiving device from a transmitting device via a communication link 700, where the transmission of the data stream is clocked at a link clock signal rate. The process further includes recovering the link clock signal and stream data from the received data stream 705, and recovering time stamps providing a relationship between the link clock and a stream clock 710, the stream clock used for the transfer of data at the receiving device. The process further includes regenerating the link clock signal based at least in part on the link clock and the recovered timestamps 715.

In some embodiments, one or more measurements related to the data stream are made in order to adjust the frequency of the stream clock signal 720. The measurements related to the data stream include one or more of a count of a number H of clock pulses in a certain period of time such as in a line of data 725 and the comparison of the value H with a reference value 730; or a determination of a number N of data elements stored in a buffer (such as a FIFO buffer) at a certain point in time such as a point in time at or before a first element (such as a pixel) is read out of the buffer 735, and the comparison of the value N with a reference value 740. The measurements may include one or more other measurements related to the data stream 745.

In some embodiments, the process includes a determination based at least in part on the measurements related to the data stream whether the stream clock is running fast, is running slow, or is accurate 750. If the stream clock is running fast 750, then the process includes decreasing a rate of a phase locked loop element 755, thereby reducing the rate of the stream clock, and continuing with the process of recovering the link clock and stream data from the received data stream 705. If the stream clock is running slow 750, then the process includes increasing a rate of the phase locked loop 760, thereby increasing the rate of the stream clock, and continuing with the process of recovering the link clock and stream data from the received data stream. If the stream clock is running accurately 750, then the rate of a phase locked loop does not require adjustment, and continues with the process of recovering the link clock and stream data from the received data stream 705.

In some embodiments, if multiple different types of measurements of the data stream are used, then the determination of whether the stream clock is accurate 750 includes a combination of the multiple measurements, whereby there is no need for adjustment of the PLL in conjunction with the adjustment of the stream clock, thereby reducing the rate of the stream clock, and continuing with the process of recovering the link clock and stream data from the received data stream.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs that are not illustrated or described. The illustrated elements or components may also be arranged in different arrangements or orders, including the reordering of any fields or the modification of field sizes.

The present invention may include various processes. The processes of the present invention may be performed by hardware components or may be embodied in computer-readable instructions, which may be used to cause a general purpose or special purpose processor or logic circuits programmed with the instructions to perform the processes. Alternatively, the processes may be performed by a combination of hardware and software.

Portions of the present invention may be provided as a computer program product, which may include a computer-readable storage medium having stored thereon computer program instructions, which may be used to program a computer (or other electronic devices) to perform a process according to the present invention. The computer-readable storage medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/computer-readable medium suitable for storing electronic instructions. Moreover, the present invention may also be downloaded as a computer program product, wherein the program may be transferred from a remote computer to a requesting computer.

Many of the methods are described in their most basic form, but processes may be added to or deleted from any of the methods and information may be added or subtracted from any of the described messages without departing from the basic scope of the present invention. It will be apparent to those skilled in the art that many further modifications and adaptations may be made. The particular embodiments are not provided to limit the invention but to illustrate it.

If it is said that an element "A" is coupled to or with element "B," element A may be directly coupled to element B or be indirectly coupled through, for example, element C. When the specification states that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification refers to "a" or "an" element, this does not mean there is only one of the described elements.

An embodiment is an implementation or example of the invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects.

What is claimed is:

1. A method comprising:
    receiving a data stream from a transmitting device via a communication link, the data stream including stream data, a link clock signal, and timestamps to indicate a relationship between the link clock signal and a stream clock signal;
    recovering a reference value from the data stream, the reference value representing an expected number of pulses in a certain period of time with the stream clock signal;
    adjusting the stream clock based at least in part on one or more-measurements related to the data stream, the adjustment of the stream clock including:
        counting a number of pulses of the stream clock during the period of time,
        comparing the count of pulses of the stream clock to the recovered reference value, and
        increasing a rate of a phase locked loop if the comparison indicates the count of pulses is below the reference value and decreasing a rate of the phase locked loop if the comparison indicates that the count of pulses is above the reference value.

2. The method of claim 1, wherein the count of the number of pulses of the stream clock in the certain time period is a count of the number of pulses in a line of data.

3. The method of claim 2, further comprising detecting blank start and blank end symbols, and wherein counting the number of pulses of the stream clock in a line of data includes counting the number of pulses between consecutive blank start symbols or blank end symbols.

4. An apparatus comprising:
    a receiver to receive a data stream via a communication link with a transmitting device, the data stream being clocked at a link clock signal rate, the data stream including timestamps to indicate a relationship between the link clock signal and a stream clock signal;
    an attribute unpacker to determine attribute values, the attribute unpacker to recover a reference value from the data stream, the reference value representing an expected number of pulses in a certain period of time with the stream clock signal;
    a stream clock recovery unit to regenerate the stream clock signal based at least in part on the link clock signal and the timestamps; and
    a phase locked loop element;
    wherein the apparatus is to adjust a rate of the stream clock signal based at least in part on one or more measurements related to the data stream, the one or more measurements including one or more of the adjustment of the rate of the stream clock signal including:
        counting a number of pulses of the stream clock during the period of time,
        comparing the count of pulses of the stream clock to the recovered reference value, and
        increasing a rate of the phase locked loop element if the comparison indicates the count of pulses is below the reference value and decreasing a rate of the phase locked loop element if the comparison indicates that the count of pulses is above the reference value.

5. The apparatus of claim 4, wherein the count of the number of pulses of the stream clock in the certain time period is a count of the number of pulses in a line of data.

6. The apparatus of claim 4, wherein the communication link is a DisplayPort™ compatible link.

7. The apparatus of claim 4, wherein the attribute unpacker is further to recover blank start and blank end symbols, and wherein counting the number of pulses of the stream clock in a line of data includes counting the number of pulses between consecutive blank start symbols or blank end symbols.

8. A non-transitory computer-readable medium having stored thereon data representing sequences of instructions that, when executed by a processor, cause the processor to perform operations comprising:
    receiving a data stream from a transmitting device via a communication link, data stream including stream data, a link clock signal, and timestamps to indicate a relationship between the link clock signal and a stream clock signal;
    recovering a reference value from the data stream, the reference value representing an expected number of pulses in a certain period of time with the stream clock signal; and
    adjusting the stream clock based at least in part on one or more measurements related to the data stream, the adjustment of the stream clock including:
        counting a number of pulses of the stream clock during the period of time,
        comparing the count of pulses of the stream clock to the recovered reference value, and
        increasing a rate of a phase locked loop if the comparison indicates the count of pulses is below the reference value and decreasing a rate of the phase locked loop if the comparison indicates that the count of pulses is above the reference value.

9. The medium of claim 8, wherein the count of the number of pulses of the stream clock in the certain time period is a count of the number of pulses in a line of data.

10. The medium of claim 9, further comprising instructions that, when executed by the processor, cause the processor to perform operations comprising:
    detecting blank start and blank end symbols;
    wherein counting the number of pulses of the stream clock in a line of data includes counting the number of pulses between consecutive blank start symbols or blank end symbols.

* * * * *